Aug. 4, 1936.  S. E. LINGLE  2,049,916
CLAMP
Filed July 17, 1933  3 Sheets-Sheet 1
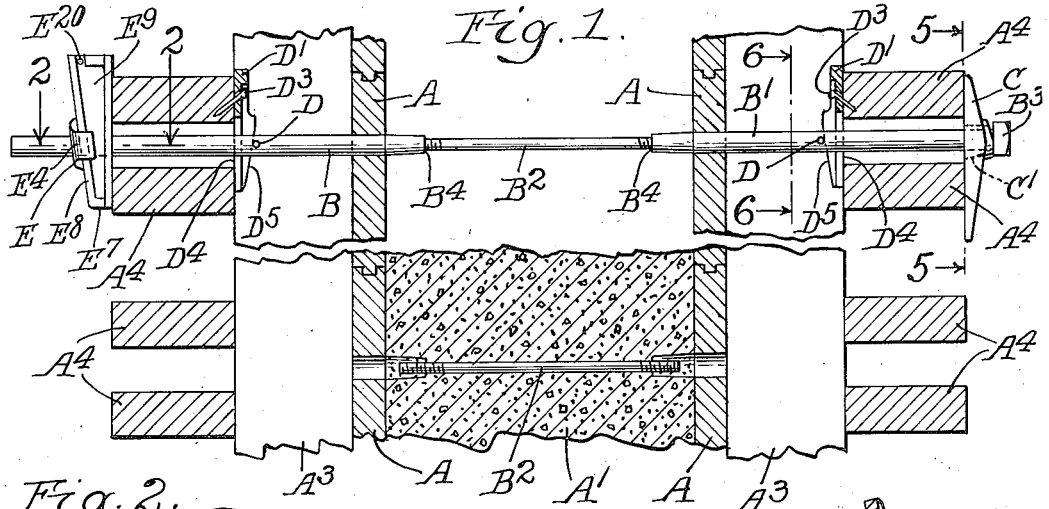
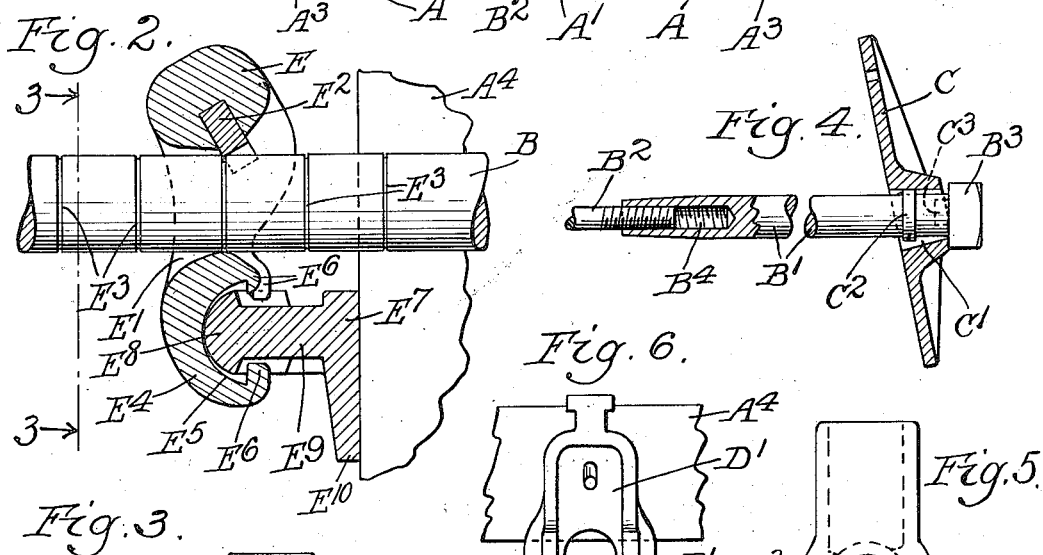
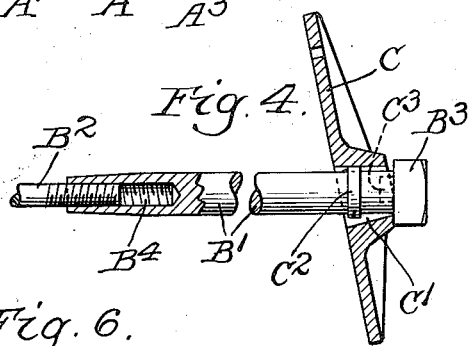
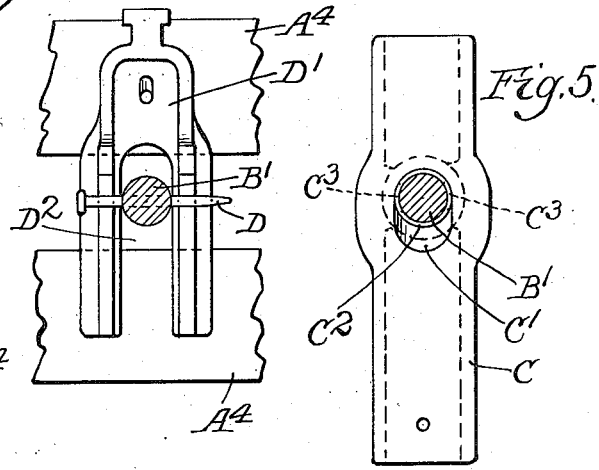
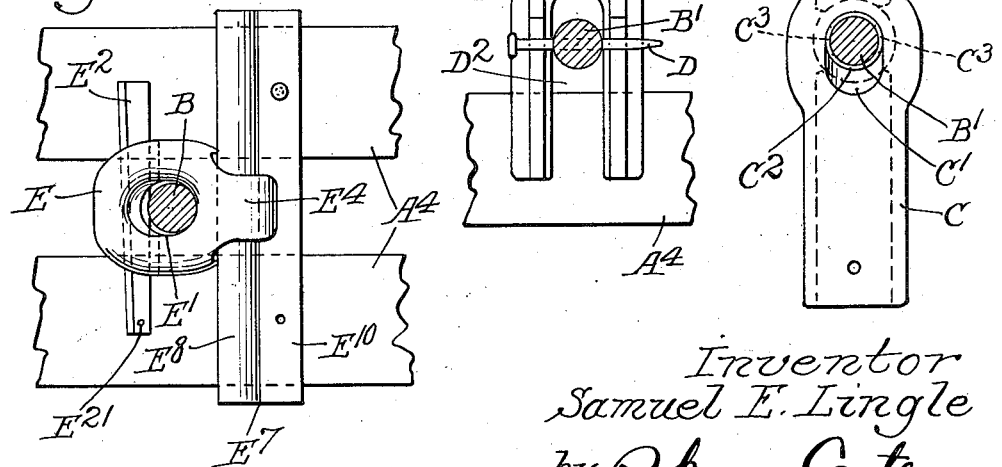
Inventor
Samuel E. Lingle
by Parker & Carter.
Attorneys.

Aug. 4, 1936.  S. E. LINGLE  2,049,916
CLAMP
Filed July 17, 1933  3 Sheets-Sheet 2
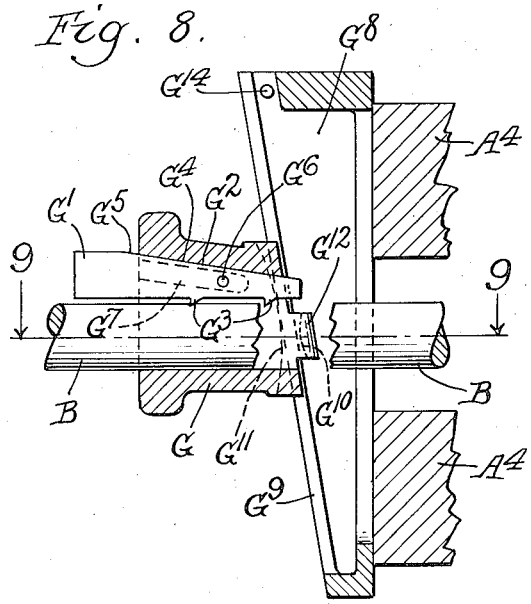
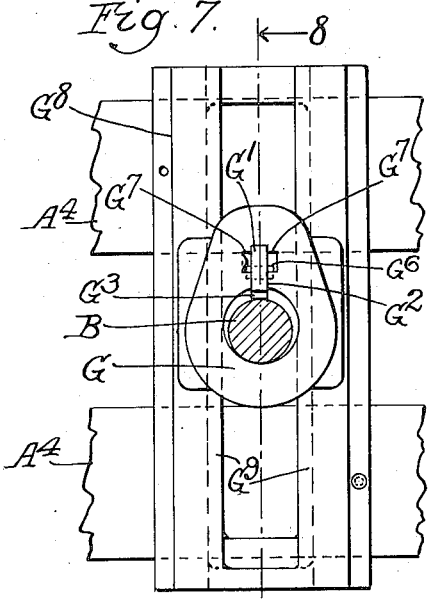
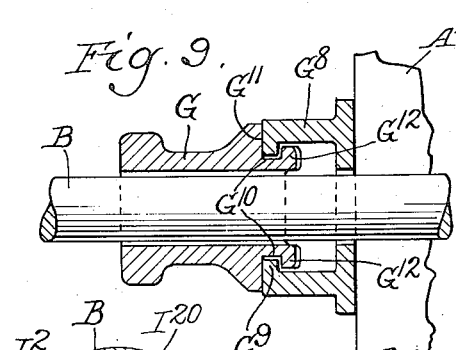
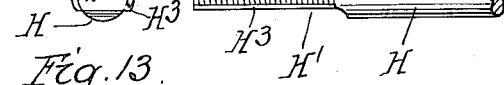
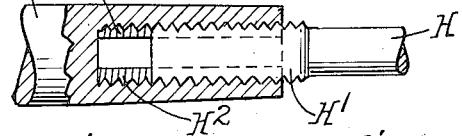
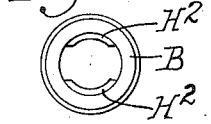
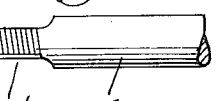
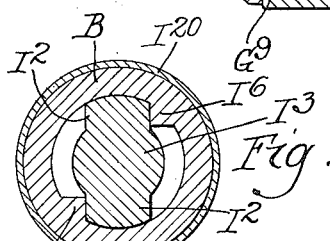
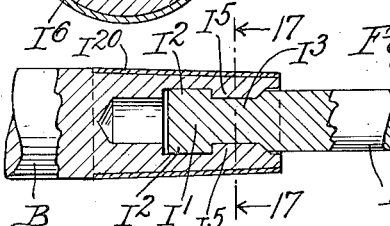
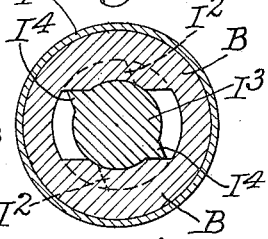
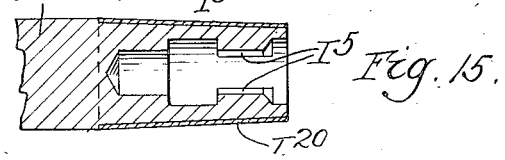
Inventor
Samuel E. Lingle
by Parker & Carter
Attorneys Aug. 4, 1936.　　　　S. E. LINGLE　　　　2,049,916
CLAMP
Filed July 17, 1933　　　3 Sheets-Sheet 3
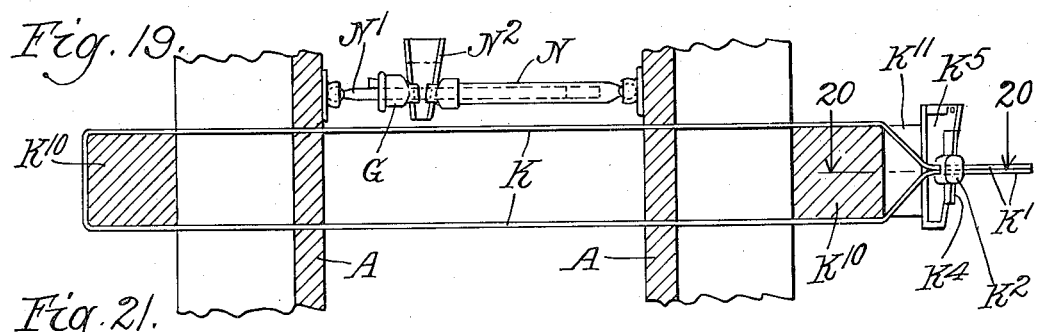
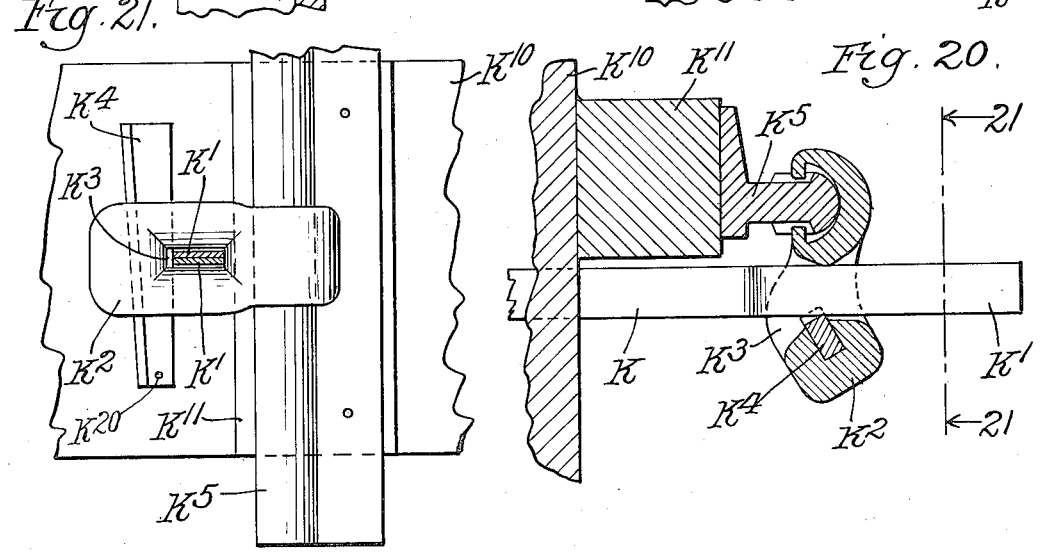
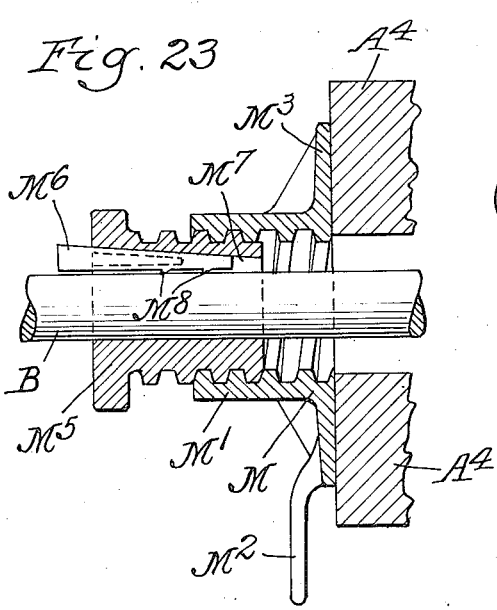
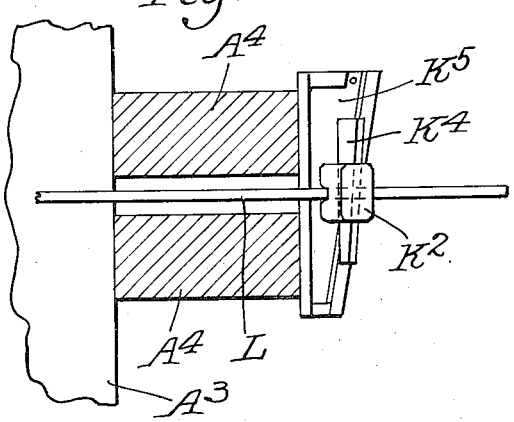
Inventor
Samuel E. Lingle
by Parker + Carter
Attorneys.

Patented Aug. 4, 1936

2,049,916

UNITED STATES PATENT OFFICE 2,049,916

CLAMP

Samuel E. Lingle, Chicago, Ill.

Application July 17, 1933, Serial No. 680,739

9 Claims. (Cl. 25—131)

My invention relates to an improvement in clamping devices and particularly applicable to employment with form clamps used in the pouring of concrete. It will be understood, however, that other uses may be made of the same invention or inventions and that I do not wish to be limited to any specific use except so far as I limit myself by positive limitations in my claims. One object is the provision of a form clamp which shall be easy and efficient to operate. Another object is the provision of such a clamp which may be assembled and disassembled with speed. Another purpose is the provision of improved tightening means for such a clamp. Another object is the provision of improved adjusting means for such a clamp. Other objects are strength, simplicity and economical manufacture. Other objects will appear from time to time in the course of the specification and claims.

I illustrate my invention more or less diagrammatically in the accompanying drawings, wherein—

Figure 1 is a vertical transverse section through a concrete form, illustrating my device in side elevation;

Figure 2 is a section on the line 2—2 of Figure 1;

Figure 3 is a section on the line 3—3 of Figure 2;

Figure 4 is a partial section of the bracket shown in Figure 1;

Figure 5 is a section on the line 5—5 of Figure 1;

Figure 6 is a section on the line 6—6 of Figure 1;

Figure 7 is an end view of a variant form of my device;

Figure 8 is a section on the line 8—8 of Figure 7;

Figure 9 is a section on the line 9—9 of Figure 8;

Figure 10 is a section of a modified form of connection between the waler rod and tie rod;

Figure 11 is a side view of the tie rod shown in Figure 10;

Figure 12 is an end view of the tie rod shown in Figures 10 and 11;

Figure 13 is an end view of the waler rod shown in Figure 10;

Figure 14 is a section showing a further modification of the connection between waler rod and tie rod;

Figure 15 is a longitudinal section through the waler rod shown in Figure 14;

Figure 16 is an end view of the tie rod shown in Figure 14;

Figure 17 is a section on the line 17—17 of Figure 14;

Figure 18 is a variant form of the structure shown in Figure 17;

Figure 19 is a transverse section through a further variation of my device;

Figure 20 is a section on the line 20—20 of Figure 19;

Figure 21 is a section on the line 21—21 of Figure 20;

Figure 22 is a view similar to Figure 19 of a portion of a further variation; and Figure 23 is a section through a still further variation.

Like parts are indicated by like symbols throughout the specification and drawings.

Referring first to the form of Figures 1 to 6 inclusive, A indicates the retaining walls or boards which form the sides of a form into which concrete or other suitable plastic material $A^1$ may be poured to set. The form walls A are held in position by vertical supports or timbers $A^3$. These in turn are held in position by the longitudinal walers $A^4$ and it is by providing tension connections between opposite sets of walers that the form as a whole is assembled into and held in position to receive the concrete or plastic. In Figure 1 I illustrate the walers as arranged in pairs.

Whereas Figure 1 illustrates the concrete in place it will be understood that the parts are assembled before the concrete is poured. The waler rods B, $B^1$ are positioned with their ends projecting into the space to be occupied by the concrete, and passing through the walls A, A and between the uprights $A^3$. The two waler rods are suitably screwthreaded at their ends as at $B^4$ to receive interiorly the outwardly screwthreaded ends of the tie rod $B^2$. One of the waler rods is shown as headed as at $B^3$ the other having a plain end as shown at the upper portion of Figure 1.

Referring to Figure 4 the headed waler rod receives a bracket member C which is apertured as at $C^1$ to pass about the waler rod. Its aperture is substantially larger than the normal diameter of the waler rod but smaller than the head $B^3$. It is herein shown as non-cylindrical but may be of any form in order to permit a ready tilting of the bracket in relation to the waler rod. This tilting is generally only necessary in one plane and the elongated cross-section of the aperture $C^1$ will be clear from the showing of Figures 4 and 5. In order to hold the bracket against displacement I may employ a collar $C^2$ which engages any suitable projection $C^3$ on the inside of the aperture $C^1$, which serves to limit longitudinal movement of the bracket C along the waler rod $B^1$.

The bracket C limits the movement of the waler rod in one direction in relation to the walers. In order to fix the waler rod B¹ against movement in the opposite direction and therefore to tighten the assembly and prevent the walls from collapsing inwardly before the concrete is poured I provide additional means for preventing relative longitudinal movement of waler rod and walers. I provide for example a transverse pin or projection D in the waler rods B and B¹, which projection may for example simply be a nail passing through an aperture in one of the waler rods. It is preferably positioned slightly inwardly beyond the faces of the walers when the walers are in the position shown in Figure 1 in relation to the bracket C. I may then interpose a wedge D¹, clearly shown for example in Figures 1 and 6, which wedge is bifurcated as at D² to pass about the waler rod. It may be hammered into place and may then be held against retrograde movement in relation to the waler, as by employment of any suitable nail, pin or the like D³. One face D⁴ of the wedge faces flat against the walers, the opposite inclined face D⁵ is a wedging or camming face opposed to the member D.

Whereas the waler rod B¹ is positioned by the head B³ and may therefore be described as the fixed rod, the opposite waler rod B, with its plain end, must be provided with some additional locking means in order to serve its function in the form clamp as a whole. In the end view of a practical structure shown in Figure 3, E generally indicates a clamping ring which may be placed on the free end of the waler rod B. This ring is provided with an aperture E¹ through which the waler rod may pass. This ring may be positioned along the waler rod by driving in a positioning wedge or taper key E². This key may be set at an angle, as shown in Figure 2, and may be sharp enough to bite into the waler rod B sufficiently to position the member E. Or a plurality of channels or indentations E³ may be provided, into which the key may penetrate. Either or both may be used. Assume that the member E has thus been positioned, as shown in Figure 2. It has a sideward extension E⁴ provided with a generally arcuate seat E⁵ bounded by inwardly projecting shoulders or lugs E⁶. Into the seat so formed I drive a wedge generally indicated as E⁷ which has an expanded edge portion E⁸ adapted to penetrate and generally conform to the seat, in order to permit a rocking motion of the parts in relation to each other. This portion E⁸ is inclined as shown in Figure 1. It is engaged by any suitable web E⁹ with a flat extended base portion E¹⁰ which may abut against a waler or walers, as shown in Figures 1, 2 and 3. As the wedge E⁷ is driven down into the position in which it is shown in Figure 1 it causes the member E to tilt about the center formed by the connection between the key E² and the waler rod B and the result is a firm locking action or clamping action of the member E upon the waler rod B. It will be understood that, in order to permit this locking action, a wedge D¹ has already been positioned against a transverse member D and that the opposite walls will have been spaced apart as by the insertion of a tie rod B². A wood or metal spreader may be used to hold the sides of the form apart, in place of the wedges D¹. The wedge E⁷ clamps the whole form together. When the device is disassembled any suitable pin E²⁰ may be employed, in order to prevent the wedge E⁷ from slipping entirely out of engagement with its mating portion of the ring E. A pin E²¹ may be used to hold the positioning pin or wedge E² from slipping entirely out of engagement with its mating portion of the ring E. The three parts are therefore held as a permanent assembly.

It will also be understood that if desired both waler rods may be employed with plane ends and with the locking means last described, instead of employing a head for one of the waler rods. However, the headed form is somewhat simpler to operate and somewhat cheaper to manufacture.

Referring to Figures 7, 8 and 9 I illustrate a variation of a locking means effective to take the place of the ring E and its associated parts. A collar G may be slipped upon the end of the waler rod B to any desired point and this collar may then be fixed against longitudinal movement along the waler rod B in one direction. Pressure on the collar in one direction tightens the grip of the teeth on the waler rod by the employment of a wedge G¹ longitudinally movable along a slot G² in the collar. It may be provided with teeth or projections G³ which are driven or wedged into or against the opposed face of the waler rod B by the opposition of the inclined surface G⁴ of the slot G² to the corresponding inclined surface G⁵ of the wedge G¹. In order to hold the parts together before or after assembly I provide a pin G⁶ on the wedge which penetrates side slots G⁷ the ends of which are closed to prevent loss of the wedge. G⁸ is any suitable wedge corresponding generally to the wedge E⁷, which may be driven into the position in which it is shown in Figures 7, 8 and 9. The wedge and the mating portions of the collar G may be formed in any suitable fashion but as illustrated the wedge is provided with inwardly projecting flanges G⁹ which penetrate corresponding slots or depressions G¹⁰ at the inner end of the sleeve G. It will be noted that a generally convex surface is provided at that point, as shown at G¹¹ in Figure 8, which allows the bearing surface of the wedge G⁸ to conform to the position of the surface of the walers A⁴, whether vertical or at an angle. This is important for example where an angular face or inclined face is provided, as in the case of an exteriorly or interiorly inclined wall. The same function is of course performed by the tilting feature of the bracket C, which permits two relatively inclined walls to be associated in a single form. The lugs G¹², as shown in Figure 9, penetrate the interior of the wedge and prevent relative displacement of the parts, the pin G¹⁴ preventing the lugs from being slipped out of the wedge. The three parts are therefore held as a permanent assembly.

Referring to Figures 10 to 18 I illustrate various forms of connection between the tie rod and the waler rods. In Figures 10, 11 and 12 I illustrate a mutilated thread on a tie rod H, the end of the tie rod being reduced as at H¹ on diametrically opposed side. The interior of the end of the waler rod is interiorly screwthreaded as at H², these threads being limited to the two diametrically opposed portions as shown in Figure 13. As shown in Figures 11 and 12 any suitable burr or projection H³ may be provided in order to limit the rotation of the tie rod in one direction whereby, when the flattened end portion has been inserted in the waler rod it can be rotated far enough to engage the threads of the opposed portions, at which time further rotation in the same direction will be terminated by engagement of the burr or projection. The result is a quick, ready connecting means.

Figures 14 to 17 inclusive illustrate a further variation of this device of the connection between waler rod and tie rod. The tie rod I has a head portion I¹ having diametrically opposed projections I² of a diameter generally the same as or slightly greater than the normal diameter of the tie rod. They project from a reduced portion or neck I³ of a diameter substantially less than that of the tie rod as a whole. However, extending along this neck I³ are fins I⁴ which extend from the normal large diameter portion of the tie rod I to the laterally extending end portions I² and serve as limit means for limiting the locking or unlocking rotation of the tie rod in relation to the waler rod. The inner end of the waler rod is correspondingly formed to receive the inwardly projecting part of the tie rod and is provided with inwardly extending locking lugs I⁵ the inner faces of which engage the opposed faces of the portions I² of the tie rod when the tie rod has been rotated into locking opposition therewith. It will be understood that the fins I⁴ prevent further relative rotation of the parts when the tie rod has been rotated to bring the members I² into opposition with the members I⁵.

In the place of the fins I⁵ I may employ rotation limiting projections I⁶ formed, as shown in Figure 18, on the interior of the aperture of the waler rod.

It may under some circumstances be advantageous to employ bands of metal or the like in the place of the waler rods and tie rods. I therefore illustrate in Figure 19 means for employing such a band. K illustrates a band the ends of which are looped around together to meet as at K¹. These opposed ends K¹, preferably parallel and conforming to each other, are passed through the aperture K³ of a clamping ring K² having the same general function and form of the ring E of Figures 1 and following. K⁴ is a positioning key having the same function as the key E². It may not always be necessary. K⁵ is a wedge having the same general form and characteristics as the wedge E⁷ of Figure 2. Similar means may be used to hold two forms together without walers. In Figures 19 and following I illustrate the employment of single walers K¹⁰ instead of the pairs of walers A⁴ as shown in Figure 1 and I may loop the band material K about the walers, as shown in Figure 19.

K¹¹ is a spacer block which may be inserted between one of the walers K¹⁰ and the wedge K⁵ because of the difficulty of bending the strip K flush against the outer face of the waler K¹⁰. Any suitable means may be employed for spacing the walers laterally apart. I may for example use the telescoping rods N N¹, clamping sleeve G and a bifurcated wedge N² straddling the rod N¹ to create a compression device whereby the walls are prevented from collapsing before the concrete is poured.

If desired, a single strip L, see Figure 22, may be employed instead of the double loop K. In such case identical locking means may be employed with the member K², the positioning key K⁴ and the wedge K⁵, or the key may be omitted. In such case it may be desirable to employ identical locking means on the opposite ends of the strip L. In Figure 22 I illustrate double walers A⁴ as in Figure 1 and the use of the spacer block K¹¹ is unnecessary.

In Figure 23 I illustrate a further variation in which an adjustable abutment is employed. I illustrate for example the waler opposing clamp member M which includes an inwardly screwthreaded sleeve M¹ and a rotating handle M² together with a relatively extended face M³ opposed to the walers A⁴. The waler rod B passes through the sleeve M¹ but is of substantially less diameter. In screwthreaded engagement with the interior threads of the sleeve M¹ is a second sleeve M⁵ which may be threaded in it in desired position in relation to the waler rod B and is then held against further movement in relation to the waler rod as by driving in the wedge M⁶ which runs in any suitable slot M⁷ in the sleeve M⁵ and which is provided with teeth M⁸. When the sleeve M⁵ has thus been fixed in relation to the waler rod B an adjustment of position may be made between waler rod and walers by rotation of the member M. This replaces the wedging action of such wedges as E⁷ G⁸ or the like.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

It will be realized for example that whereas I have shown my device in connection with preventing movement of opposed walls or forms away from each other, that the same invention may be employed in connection with preventing movement of walls toward each other, my device being employed for compression instead of tension. For example, the specific locking wedging connections I have employed are equally applicable to structures for preventing the collapse of trench walls where constant pressure is applied to the exterior of the walls. For example, the structure shown at N, N¹ and N² of Figure 19 may be employed to prevent a collapse of boards lining the opposed walls of a trench.

In relation to Figures 1 and 2 for example, I find it advantageous to so proportion the opposed parts of the wedge E⁷ and the ring member E that when the wedge E⁷ is in its uppermost position the web E⁹ is generally at right angles to the plane of the ring E. As the wedge moves downwardly into the waler engaging position it can tilt or rotate slightly so that the plane of the web E⁹ and therefore the face of the wedge can conform to the face of the waler while permitting the ring E to be tilted slightly by the wedging action of the wedge and therefore by the pressure against one side of the ring which produces the binding action of the ring E on the rod B. Further, in reference to Figures 1 and 2, it will be understood that the ring E may be used as a substitute for the wedge D¹, by a mere reversal of the facing of the ring. In other words, the ring E can lock on one side of a waler as easily as it can on the other.

In relation to the form of Figures 19 and following, I may find it advantageous somewhat to enlarge the diameter of the slot K³ through which the ends of the band K pass. I may then employ any suitable wedging means through the middle of the aperture K³ and, if desired, between the abutting ends of the band K. What I wish to make clear is that I do not wish myself to be limited to the particular locking means of Figure 21, for example, involving the locking wedge K⁴ which is a convenient but not a positively necessary locking means.

In Figures 14 and 15, a collar I²⁰ is illustrated at the end of the member B. Its purpose is to provide a surface which is less likely to adhere to the concrete. I may employ any suitable material for this purpose but find brass to be satisfactory as it will not oxidize as readily as iron or form an adhesive connection with the hardening concrete.

I claim:

1. In a clamping device for forms and the like, a rod adapted to pass through the form to be clamped, a locking member mounted on said rod, exterior to said form, said locking member being apertured to permit the passage of the rod therethrough, a wedge adapted to be interposed between one side of said locking member and the form, and at one side of said rod, said wedge and locking member being provided with interpenetrating portions, and a sharp edged rod engaging abutment, the sharp edge of which is positioned within the aperture of the locking member on the side of the locking member opposite to its engagement with the wedge.

2. In a clamping device for forms and the like, a rod adapted to pass through the form to be clamped, a locking member mounted on said rod, exterior to said form, said locking member being apertured to permit the passage of the rod therethrough, a wedge adapted to be interposed between one side of said locking member and the form, and at one side of said rod, said wedge and locking member being provided with interpenetrating portions, and a sharp edged rod engaging abutment, the sharp edge of which is positioned within the aperture of the locking member on the side of the locking member opposite to its engagement with the wedge, said abutment being in the form of a wedge, the locking member being provided with an aperture to receive said wedge, said aperture being in communication with the aperture through which the rod passes.

3. In a clamping device for forms and the like, a rod adapted to pass through the form to be clamped, a locking member mounted on said rod, exterior to said form, said locking member being apertured to permit the passage of the rod therethrough, a wedge adapted to be interposed between said locking member and the form and being disposed on one side only of the axis of said rod, said wedge and locking member being provided with cooperating means for limiting relative movement of said wedge towards and away from said rod.

4. In a clamping device for forms and the like, a rod adapted to pass through the form to be clamped, a locking member mounted on said rod, exterior to said form, said locking member being apertured to permit the passage of the rod therethrough, a wedge adapted to be interposed between said locking member and the form, and being disposed on one side only of the axis of said rod, whereby to tilt the locking member on said rod to lock said member against longitudinal movement with respect to said rod.

5. In a clamping device for forms and the like, a rod adapted to pass through the form to be clamped, a locking member mounted on said rod, exterior to said form, said locking member being apertured to permit the passage of the rod therethrough, a lateral extension carried by said locking member, a wedge adapted to be interposed between said lateral extension of the locking member and the form, on one side of the axis of said rod, said wedge being provided with an extended flange having a face adapted to be opposed to the face of the form, and an additional flange on said wedge inclined to its form engaging face, the locking member being provided with elements interpenetrating with said last mentioned flange to limit relative movement between the flange and wedge.

6. In a clamping device for forms and the like, a rod adapted to pass through the form to be clamped, a locking member mounted on said rod, exterior to said form, said locking member being apertured to permit the passage of the rod therethrough, a wedge adapted to be interposed between said locking member and the rod to lock the locking member on said rod, and an additional wedge positioned between the form and said locking member and tending to shift the locking member with respect to the rod to increase the wedging action of said first mentioned wedge.

7. In a clamping device for forms and the like, a rod adapted to pass through the form to be clamped, a locking member mounted on said rod, exterior to said form, said locking member being apertured to permit the passage of the rod therethrough, a wedge adapted to be interposed between said locking member and the rod to lock the locking member on said rod, and an additional wedge positioned between the form and said locking member and movable transversely of the axis of said rod, the axis of movement of said first mentioned wedge being generally parallel with the axis of the rod whereby relative movement of the locking member on the rod due to wedging action of said additional wedge transversely of the rod axis, increases the wedging action between the first mentioned wedge and the opposed surfaces of the locking member and rod.

8. In a clamping device for forms and the like, a rod adapted to pass through the form to be clamped, a locking member mounted on said rod, exterior to said form, said locking member being apertured to permit the passage of the rod therethrough, a wedge interposed between said locking member and the rod, and disposed on one side of the axis of said rod, and a second wedge adapted to be interposed between the locking member and the face of the form on the opposite side of the axis of said rod.

9. In a clamping device for forms and the like, a rod adapted to pass through the form to be clamped, a locking member mounted on said rod, exterior to said form, said locking member being apertured to permit the passage of the rod therethrough, a wedge interposed between said locking member and the rod and disposed transversely of the axis of the rod on one side thereof, and a second wedge adapted to be interposed between the locking member and the face of the form on the opposite side of the axis of said rod, said wedges being arranged to exert their respective wedging actions in transversely disposed planes.

SAMUEL E. LINGLE.